United States Patent [19]

Tanaka et al.

[11] Patent Number: 4,702,729
[45] Date of Patent: Oct. 27, 1987

[54] TIMING BELT WITH CONTROLLED FRICTION BACKSIDE RIBS

[75] Inventors: Hiroyuki Tanaka; Eiichi Takami, both of Kobe; Kyoichi Mishima, Suzurandaihigashi; Mitsunobu Higashi; Toshimi Kumasaki, both of Kobe, all of Japan

[73] Assignee: Mitsuboshi Belting Ltd., Nagata, Japan

[21] Appl. No.: 827,775

[22] Filed: Feb. 7, 1986

[51] Int. Cl.$^4$ ................................................. F16G 1/28
[52] U.S. Cl. ...................................... 474/205; 474/251
[58] Field of Search .......................... 474/205, 249-251

[56] References Cited

U.S. PATENT DOCUMENTS

| | | | |
|---|---|---|---|
| 2,699,685 | 1/1955 | Waugh | 474/251 |
| 3,151,491 | 10/1964 | Case | 474/205 |
| 3,643,518 | 2/1972 | Semin et al. | 74/219 |
| 3,673,883 | 7/1972 | Adams | 474/205 |
| 4,276,039 | 6/1981 | Takano | 474/205 |
| 4,337,056 | 6/1982 | Bruns | 474/205 |
| 4,410,314 | 10/1983 | Miranti, Jr. et al. | 474/251 |
| 4,494,947 | 1/1985 | Miranti, Jr. et al. | 474/251 |
| 4,559,029 | 12/1985 | Miranti, Jr. et al. | 474/251 |
| 4,571,224 | 2/1986 | Arinaga | 474/205 |

Primary Examiner—Stephen J. Novosad
Assistant Examiner—Bruce M. Kisliuk
Attorney, Agent, or Firm—Wood, Dalton, Phillips, Mason & Rowe

[57] ABSTRACT

A timing belt having an outer section defined by cogged ribs defining a preselected controlled coefficient of friction obtained by providing controlled size grooves extending transversely through the ribs. The ratio of the effective side area of the grooves to the side area of the cogs defined in the ribs by the grooves, in the illustrated embodiment, is in the range of approximately ½ to 2½ where the coefficient of the rib material is approximately 0.35. The cogs are raw edged and provided with a cover fabric. The provision of the cogged ribs permits the belt to be used as a double timing belt as well as providing improved functioning with backside rib pulleys. The effective coefficient of friction obtained by reducing the side area of the ribs as a result of the provision of the grooves is preferably in the range of 0.15 to approximately 0.90. The total area of all of the side faces of the cogs and effective side areas of the grooves is approximately equal to the height of the outer section defined by the cogs and grooves multiplied by the length of the belt.

18 Claims, 3 Drawing Figures

TIMING BELT WITH CONTROLLED FRICTION BACKSIDE RIBS

DESCRIPTION

1. Technical Field

This invention relates to belts and in particular to timing belts.

2. Background Art

In one conventional form of timing belt having longitudinally spaced teeth on the inner section thereof, longitudinally extending ribs are provided in the outer, or tension, section of the belt adapted to have engagement with an idler pulley or the like.

A problem arises in the use of such ribbed timing belts in that such ribs limit the contacting angle with the pulley as they restrict the bendability of the belt. Thus, while such ribs provide a large contacting area with the pulley so as to provide high power transmission therebetween, because of the limitation on the contacting angle heretofore required to provide the necessary bendability of the belt, high power transmission in such belts has been restricted heretofore.

DISCLOSURE OF INVENTION

The present invention comprehends the provision of a novel timing belt wherein the backside ribs are provided with longitudinally spaced, transversely extending grooves so as to define a series of longitudinally spaced cogs, the side faces of which engage the complementary pulley groove surfaces in transmitting power between the belt and pulley.

The provision of the transversely extending grooves in the backside ribs provides for improved bendability of the belt while yet, at the same time, the use of the backside cogged ribs provides for desired high power transmission as a result of the friction between the side faces of the cogs and the confronting surfaces of the pulley grooves.

The invention comprehends providing the outer section of the belt defined by the longitudinally spaced cog side faces to have a predetermined friction which is a function not only of the frictional characteristics of the material making up the cogged ribs, but also the ratio of the area of the side faces of the cogs to the coplanar area of the grooves between the cogs.

Thus, in broad aspect, the invention comprehends providing a timing belt provided with backside ribs which are discontinuous in such a manner as to provide a preselected frictional engagement between the ribs and the cooperating pulley, thereby providing for preselected high power transmission with concurrent desired bendability of the belt.

More specifically, the invention comprehends the provision in a timing belt having an outer section, an inner toothed section, and an intermediate section provided with a plurality of longitudinally extending tensile cords, the outer section being provided with transversely spaced ribs having longitudinally spaced transverse grooves defining therebetween a series of cogs having side faces, the effective coefficient of friction $\mu$ of the side of the ribs being $$\mu = C \times (A_g/A_c)$$

where $C$ = coefficient of friction of the rib material, $A_g$ = area of the portion of the side of the ribs defined by said grooves, and $A_c$ = area of the side of the cogs, of preselecting $A_g$ and $A_c$ to cause $\mu$ to be less than approximately 0.90 where $C$ = approximately 0.35.

More specifically, in the illustrated invention, the coefficient of friction of the rib material is approximately 0.35.

Further more specifically, in the present invention, the values of $A_g$ and $A_c$ are preselected to cause $\mu$ to be in the range of approximately 0.15 to approximately 0.90.

In the illustrated embodiment, the side faces of the cogs are inclined at less than 90° to the transverse extent of the belt, whereby the cogs define a trapezoidal transverse cross section.

The side faces of the cogs comprise raw edge surfaces of the outer section of the belt and the ribs are provided with a cover fabric.

In the illustrated embodiment, the ribs are formed of rubber which may comprise rubber similar to the rubber of which the other sections of the belt are formed.

In the illustrated embodiment, the cogs are aligned with the teeth of the inner section of the belt.

The tensile cords are located at the pitch line of the belt in the illustrated embodiment.

The timing belt of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
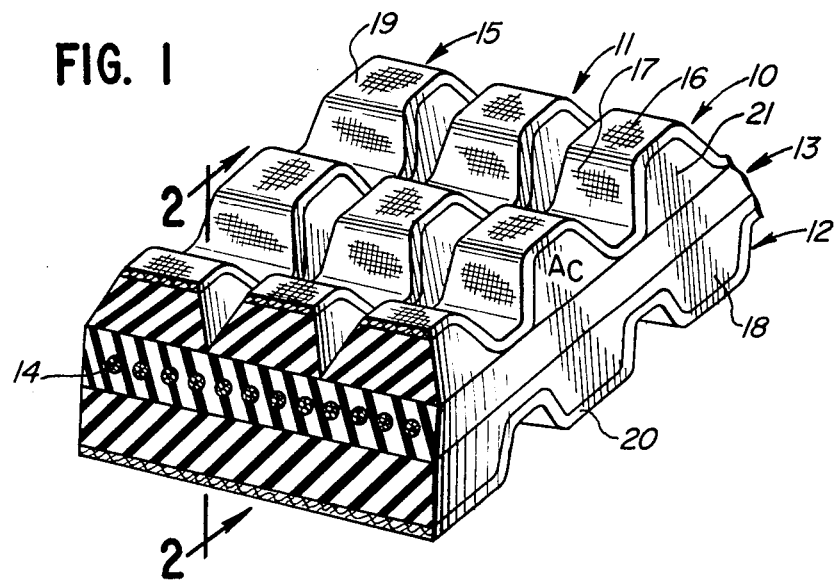
FIG. 1 is a fragmentary perspective view of a timing belt embodying the invention.

In the illustrative embodiment of the invention as disclosed in the drawing, a timing belt generally designated 10 includes an outer tension section generally designated 11, an inner toothed compression section generally designated 12, and an intermediate section generally designated 13 provided with a plurality of longitudinally extending transversely spaced tensile cords 14.

In the illustrated embodiment, the outer section 11 is defined by a plurality of longitudinally extending discontinuous ribs generally designated 15 defined by a series of longitudinally alternating cogs 16 and grooves 17. As seen in FIG. 1, a plurality of the discontinuous ribs 15 are provided in transversely side-by-side spaced relationship. In the illustrated embodiment, cogs 16 are aligned with the longitudinally spaced teeth 18 of the inner section 12.

In the illustrated embodiment, ribs 15 are provided with an outer fabric cover 19 and teeth 18 are provided with an inner fabric cover 20. As shown in FIG. 1, the side faces 21 of the cogs are raw edge, i.e. not covered with fabric.

In the illustrated embodiment, the tensile cords are formed of low elongated, high strength material, such as polyester resin, polyamide resin, aromatic polyamide resin, rayon, glass fibers, carbon fibers, and the like. Intermediate section 13 is defined by a layer of rubber intermediate the inner and outer sections, and in the illustrated embodiment, rubber layer 13 is formed of a stretchable rubber, such as natural rubber, chloroprene rubber, nitrile rubber, butyl rubber, styrene-butadiene rubber, chlorosolonated polyethylene, hydrogenated nitrile rubber, etc., or a blend thereof.

In the illustrated embodiment, the inner section 12 and the outer section 11 are formed of similar rubber and, thus, may be molded integrally in the formation of the belt.

The tooth covering fabric 20 may comprise conventional stretchable fabric, such as canvas with one or more plies of rubber woven with warps of crimped polyamide fiber, aromatic polyamide fiber, etc., and wefts of conventional nonstretchable yarns.

The fabric 19 may comprise one or more plies of bias canvas fabric, a wide angle canvas fabric made of wefts and warps of cotton yarns, polyester resin, polyamide resin, aromatic polyamide resin, or a mixture thereof. The cover fabric 19 may be applied with layers of rubber similarly as fabric 20.

As shown in FIG. 1, the side faces of the teeth 18 and ribs 15 comprise raw edge surfaces.

The coefficient of friction of the rubber utilized defining the cogs 16, in the illustrated embodiment, is approximately 0.35. The invention comprehends causing the discontinuity in the ribs 15 to be such as to reduce the total area of the side faces of the ribs engaging the pulley surfaces a preselected amount by the provision of the grooves 17. More specifically, the invention comprehends causing the reduction in the side area of the ribs to cause the effective coefficient of friction of the side faces 21 of the cogs with the pulley to meet the following requirements:

$$0.35 \times (A_g/A_c) \leq \mu \leq 0.90$$

where $A_g=$ the area of the portion of the side of the ribs defined by the grooves and $A_c=$ the area of the side of the cogs, and the coefficient of friction of the cover material $=0.35$.

As will be obvious to those skilled in the art, the desirable range of $\mu$ may be achieved with materials having coefficients of friction differing from the 0.35 coefficient by suitably varying the side areas of the cogs relative to the effective side area of the grooves.

Thus, the invention comprehends reducing the coefficient of friction of the rubber material of the ribs by effectively reducing the total area of the ribs by suitably proportioning the size of the grooves to the size of the cogs. It is contemplated that the coefficient of friction of the cog material is higher than the minimum value of 0.15, as set out in the formula, and that the use of the transverse grooves providing the reduced area of the cogs defining the discontinuous ribs provide the desired reduced frictional coefficient.

The provision of the longitudinally spaced cogs 16 in the backside of the belt permits the belt further to be utilized as a double timing belt wherein the cogs serve as teeth in cooperation with a toothed pulley, when desired. Thus, the belt of the present invention has the universal characteristic of being adapted for use in high power transmission with ribbed pulleys, as well as synchronous timing functioning with front and backside toothed pulleys. The improved bendability of the belt provides for extended usefulness in a wide range of applications, such as in the automotive field.

The invention comprehends, as discussed above, providing a ratio of the side area of the grooves to the side area of the ribs in the range of approximately ½ to approximately 2½ times where the coefficient of friction of the cog material is approximately 0.35.

Figure 2:
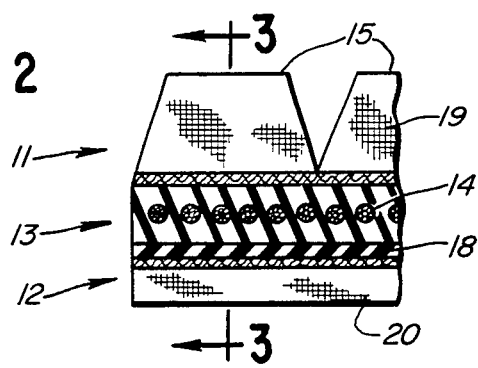
FIG. 2 is a fragmentary vertical section taken substantially along the line 2—2 of FIG. 1.
Figure 3:
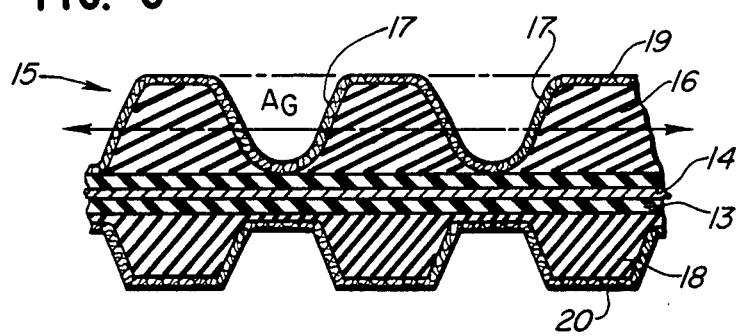
FIG. 3 is a fragmentary longitudinal section taken substantially along the line 3—3 of FIG. 2.

As illustrated in FIG. 2, the respective ribs effectively define discontinuous V-ribs having a trapezoidal cross section. The ribs are disposed in contiguous side-by-side relationship in the illustrated embodiment.

The foregoing disclosure of specific embodiments is illustrative of the broad inventive concepts comprehended by the invention.

We claim:

1. In a timing belt having an outer section, an inner toothed section, and an intermediate section provided with a plurality of longitudinally extending tensile cords, said outer section being provided with transversely spaced ribs extending lengthwise of said belt, each said rib having opposite sides each inclined at less than 90° to the transverse extent of the belt for engagement with a pulley, said ribs having longitudinally spaced transverse grooves defining therebetween a series of cogs, the effective coefficient of friction $\mu$ of the sides of said ribs being $\mu = 0.35 \times (A_g/A_c)$ where $A_g=$ area of the portion of each side of said ribs defined by said grooves and $A_c=$ area of each rib side defined by the cogs, the improvement comprising preselecting $A_g$ and $A_c$ to cause $\mu$ to be in the range of $0.15 \times \mu \times 0.90$.

2. The timing belt of claim 1 wherein said cogs define a trapezoidal transverse cross section.

3. The timing belt of claim 1 wherein said side faces of the cogs comprise raw edge surfaces of said outer section.

4. The timing belt of claim 1 wherein said ribs are provided with a cover fabric.

5. The timing belt of claim 1 wherein said outer section is defined by a plurality of side-by-side ribs having a trapezoidal transverse cross section.

6. The timing belt of claim 1 wherein said ribs are formed of rubber.

7. The timing belt of claim 1 wherein said outer and intermediate sections are formed of similar rubber.

8. The timing belt of claim 1 wherein said outer, intermediate, and inner toothed sections are formed of a similar rubber.

9. The timing belt of claim 1 wherein said inner section defines a plurality of longitudinally spaced teeth, said cogs being aligned lengthwise of the belt one each with said teeth.

10. The timing belt of claim 1 wherein said belt defines a longitudinal pitch line and said tensile cords are disposed at said pitch line.

11. The timing belt of claim 1 wherein said outer section of the belt is formed of any one of the group consisting of natural rubber, chloroprene rubber, nitrile rubber, butyl rubber, styrene-butadiene rubber, chlorosulfonated polyethylene, and hydrogenated nitrile rubber.

12. The timing belt of claim 1 wherein said outer section of the belt is formed of a blend of two or more materials taken from the group consisting of natural rubber, chloroprene rubber, nitrile rubber, butyl rubber, styrene-butadiene rubber, chlorosulfonated polyethylene, and hydrogenated nitrile rubber.

13. The timing belt of claim 1 wherein said ribs are provided with a cover fabric comprising bias laid canvas.

14. The timing belt of claim 1 wherein said ribs are provided with a cover fabric comprising wide angle canvas formed of cotton, polyester resin, polyamide resin, or mixtures thereof.

15. The timing belt of claim 1 wherein said ribs are provided with a cover fabric comprising rubber-coated canvas.

16. The timing belt of claim 1 wherein each of said outer and inner sections is provided with a cover fabric.

17. In a timing belt having an outer section, an inner toothed section, and an intermediate section provided with a plurality of longitudinally extending tensile cords, said outer section being provided with transversely spaced ribs extending lengthwise of said belt, each said rib having opposite sides each inclined at less than 90° to the transverse extent of the belt for engagement with a pulley, said ribs having longitudinally spaced transverse grooves defining therebetween a series of cogs, the effective coefficient of friction $\mu$ of the sides of said ribs being $\mu = C \times (A_g/A_c)$ where $C=$ coefficient of friction of the rib material, $A_g=$ area of the portion of each side of said ribs defined by said grooves, and $A_c=$ area of each rib side defined by the cogs, the improvement comprising preselecting $A_g$ and $A_c$ to cause $\mu$ to be less than approximately 0.90 where $C=$ approximately 0.35.

18. The timing belt of claim 17 wherein $\mu$ is greater than approximately 0.15.

* * * * *